United States Patent
Moiin et al.

(10) Patent No.: US 6,192,483 B1
(45) Date of Patent: Feb. 20, 2001

(54) DATA INTEGRITY AND AVAILABILITY IN A DISTRIBUTED COMPUTER SYSTEM

(75) Inventors: Hossein Moiin, San Francisco; Angelo Pruscino, Mountain View, both of CA (US)

(73) Assignee: Sun Microsystems, Inc., Palo Alto, CA (US)

(*) Notice: Under 35 U.S.C. 154(b), the term of this patent shall be extended for 0 days.

(21) Appl. No.: 08/967,341

(22) Filed: Oct. 21, 1997

(51) Int. Cl.$^7$ .................................................. G06F 11/14
(52) U.S. Cl. ............................. 714/4; 714/43; 713/100; 709/221
(58) Field of Search ................... 714/4, 55, 43; 713/100; 709/213, 214, 215, 239, 220, 221; 711/152

(56) References Cited

U.S. PATENT DOCUMENTS

| | | | |
|---|---|---|---|
| 5,327,560 | * 7/1994 | Hirata et al. | 395/700 |
| 5,666,486 | * 9/1997 | Alfieri et al. | 395/200.47 |
| 5,737,515 | * 4/1998 | Matena | 395/182.21 |
| 5,822,531 | * 10/1998 | Gorczyca et al. | 395/200.51 |
| 5,860,108 | * 1/1999 | Horikawa | 711/141 |
| 5,892,895 | * 4/1999 | Basavaiah et al. | 714/4 |
| 5,961,650 | * 10/1999 | Arendt et al. | 714/2 |

* cited by examiner

*Primary Examiner*—Robert W. Beausoliel, Jr.
*Assistant Examiner*—Scott T. Baderman
(74) *Attorney, Agent, or Firm*—Conley, Rose & Tayon, PC; B. Noël Kivlin

(57) ABSTRACT

Data integrity and availability is assured by preventing a node of a distributed, clustered system from accessing shared data in the case of a failure of the node or communication links with the node. The node is prevented from accessing the shared data in the presence of such a failure by ensuring that such a failure is detected in less time than a secondary node would allow user I/O activities to commence after reconfiguration. The prompt detection of failure is assured by periodically determining which configuration of the current cluster each node believes itself to be a member of Each node maintains a sequence number which identifies the current configuration of the cluster. Periodically, each node exchanges its sequence number with all other nodes of the cluster. If a particular node detects that it believes itself to be a member of a preceding configuration to that to which another node belongs, the node determines that the cluster has been reconfigured since the node last performed a reconfiguration. Therefore, the node must no longer be a member of the cluster. The node then refrains from accessing shared data. In addition, if a node suspects a failure in the cluster, the node broadcasts a reconfigure message to all other nodes of the cluster through a public network. Since the messages are sent through a public network, failure of the private communications links between the nodes does not prevent receipt of the reconfigure messages.

9 Claims, 3 Drawing Sheets

DATA INTEGRITY AND AVAILABILITY IN A DISTRIBUTED COMPUTER SYSTEM

FIELD OF THE INVENTION

The present invention relates to fault tolerance in distributed computer systems and, in particular, to a particularly robust mechanism for assuring integrity and availability of data in the event of one or more failures of nodes and/or resources of a distributed system.

BACKGROUND OF THE INVENTION

1. Introduction and Background

Main motivations for distributed computer systems are the addition of high availability and increased performance. Distributed computer systems support a host of highly-available or parallel applications, such as Oracle Parallel Server (OPS) Informix XPS or HA-NFS. While the key to the success of distributed computer systems in the high-end market has been high-availability and scalable performance, another key has been the implicit guarantee that the data trusted to such distributed computer system will remain integral.

2. System Model and Classes of Failures

The informal system model for some distributed computer systems is that of a "trusted" asynchronous distributed system. The system is composed of 2 to 4 nodes that communicate via message exchange on a private communication network. Each node of the systems has two paths into the communication medium so that the failure of one path does not isolate the node from other cluster members. The system has a notion of membership that guarantees that the nodes come to a consistent agreement on the set of member nodes at any given time. The system is capable of tolerating failures and the failed nodes are guaranteed to be removed from the cluster within bounded time by using fail-fast drivers and timeouts. The nodes of the distributed system are also connected to an external and public network that connects the client machines to the cluster. The storage subsystem may contain shared data that may be accessed from different nodes of the cluster simultaneously. The simultaneous access to the data is governed by the upper layer applications. Specifically, if the application is OPS then simultaneous access is granted as OPS assumes that the underlying architecture of the system is a shared-disk architecture. All other applications that are supported on the cluster assume a shared nothing architecture and therefore, do not require simultaneous access to the data.

While the members of a cluster are "trusted", nodes that are not part of the current membership set are considered "un-trusted". The un-trusted nodes should not be able to access shared resources of the cluster. These shared resources are the storage subsystem and the communication medium. While the access to the communication medium may not pose a great threat to the operation of the cluster, other than a possible flooding of the medium by the offending node(s), the access to the shared storage sub-system constitutes a serious danger to the integrity of the system as an un-trusted node may corrupt the shared data and compromise the underlying database. To fence non-member nodes from access to the storage sub-system the nodes that are members of the cluster exclusively reserve the parts of the storage sub-system that they "own". This results in exclusion of all other nodes, regardless of their membership status, from accessing the fenced parts of the storage sub-system. The fencing has been done, up to now, via low level SCSI-2 reservation techniques, but it is possible to fence the shared data by the optional SCSI-3 persistent group reservations as those are, in fact, a super-set of SCSI-2 reservations. It is important to note that we assume that the nodes that could possibly form the cluster, regardless of whether they are current cluster members or not, do not behave maliciously. The cluster does not employ any mechanisms, other than requiring root privileges for the user, to prevent malicious adversaries from gaining membership in the cluster and corrupting the shared database.

While it is easy to fence a shared storage device if that device is dual-ported, via the SCSI-2 reservations, no such technique is available for multi-ported devices, as the necessary but optional SCSI-3 reservations are not implemented by the disk drive vendors. In this paper we assume that the storage sub-system is entirely composed of either dual-ported or multi-ported devices. Mixing the dual and multi-ported storage devices does not add any complexity to our algorithms, but will make the discussion more difficult to follow. It should be pointed out, however, that a multi-ported storage sub-system has better availability characteristics than a dual-ported one as more node failures can be tolerated in the system without loss of access to the data. Before we investigate the issues of availability, data integrity, and performance we should classify the nature of faults that our systems are expected to tolerate.

There are many possible ways of classifying the types of failures that may occur in a system. The following classification is based on the intent of the faulty party. The intent defines the nature of the faults and can lead the system designer to guard against the consequences of such failures. Three classes of failures can be defined on the basis of the intent:

1. No-Fault Failures: This class of failures include various hardware and software failures of the system such as node failures, the communication medium failures, or the storage sub-system failures. All these failures share the characteristic that they are not the result of any misbehavior on the part of the user or the operator. A highly-available system is expected to tolerate some such failures. The degree to which a system is capable of tolerating such failures and the affect on the users of the system determine the class (e.g, fault-tolerant or highly-available) and level (how many and what type of failures can be tolerated simultaneously or consecutively) of availability in a traditional paradigm.

2. Inadvertent Failures: The typical failure in this class is that of an operator mistake or pilot error. The user that causes a failure in this class does not intend to damage the system, however, he or she is relied upon to make the right decisions and deviations from those decisions can cause significant damage to the system and its data. The amount of protection the system incorporates against such failures defines the level of trust that exists between the system and its users and operators. A typical example of this trust in a UNIX environment is that of a user with root privileges that is relied upon to behave responsibly and not delete or modify files owned and used by other users. Some distributed systems assume the same level of trust as the operating system and restricts all the activities that can affect other nodes or users and their data to a user with root privileges.

3. Malicious Failures: This is the most difficult class of failures to guard against and is generally solved by use of authenticated signatures or similar security techniques. Most systems that are vulnerable to attacks by malicious users must take extra security measures to prevent access to such users. Clusters, in general, and Sun Cluster 2.0 available from Sun Microsystems, Inc. of Palo Alto, Calif., in particular, are typically used as back-end systems and are assumed immune from malicious attacks as they are not directly visible to users outside the local area network in which they are connected to a selected number of clients. As an example of this lack of security, consider a user that can break into a node and then joins that node as a member of cluster of a distributed system. The malicious user can now corrupt the database by writing on the shared data and not following the appropriate protocols, such as acquiring the necessary data locks. This lack of security software is due to the fact that some distributed systems are generally assumed to operate in a "trusted" environment. Furthermore, such systems are used as high-performance data servers that cannot tolerate the extra cost of running security software required to defend the integrity of the system from attack by malicious users.

Note that the above classification is neither comprehensive nor that the classes are distinct. However, such classification serves as a model for discussing the possible failures in a distributed system. As mentioned earlier, we must guard against no-fault failures and make it difficult for inadvertent failures to occur. We do not plan to incorporate any techniques in system software to reduce the probability of malicious users from gaining access to the system. Instead, we can offer third party solutions that disallow access to potentially malicious parties. One such solution is the Fire Wall-1 product by Check Point Software Technologies Limited which controls access, connection, and provides for authentication. Note that the addition of security to a cluster greatly increases the cost and complexity of communication among nodes and significantly reduces the performance of that system. Due to the performance requirements of high-end systems, such systems typically incorporate security checks in the software layer that interacts directly with the public network and assume that the member nodes are trusted so that the distributed protocols, such as membership, do not need to embed security in their designs.

SUMMARY OF THE INVENTION

In accordance with the present invention, data integrity and availability is assured by preventing a node of a distributed, clustered system from accessing shared data in the case of a failure of the node or communication links with the node. The node is prevented from accessing the shared data in the presence of such a failure by ensuring that such a failure is detected in less time than a secondary node would allow user I/O activities to commence after reconfiguration.

The prompt detection of failure is assured by periodically determining which configuration of the current cluster each node believes itself to be a member of. Each node maintains a sequence number which identifies the current configuration of the cluster. Periodically, each node exchanges its sequence number with all other nodes of the cluster. If a particular node detects that it believes itself to be a member of a preceding configuration to that to which another node belongs, the node determines that the cluster has been reconfigured since the node last performed a reconfiguration. Therefore, the node must no longer be a member of the cluster. The node then refrains from accessing shared data.

In addition, if a node suspects a failure in the cluster, the node broadcasts a reconfigure message to all other nodes of the cluster through a public network. Since the messages are sent through a public network, failure of the private communications links between the nodes does not prevent receipt of the reconfigure messages.

DETAILED DESCRIPTION

3. Dual-Ported Architectures

Figure 1:
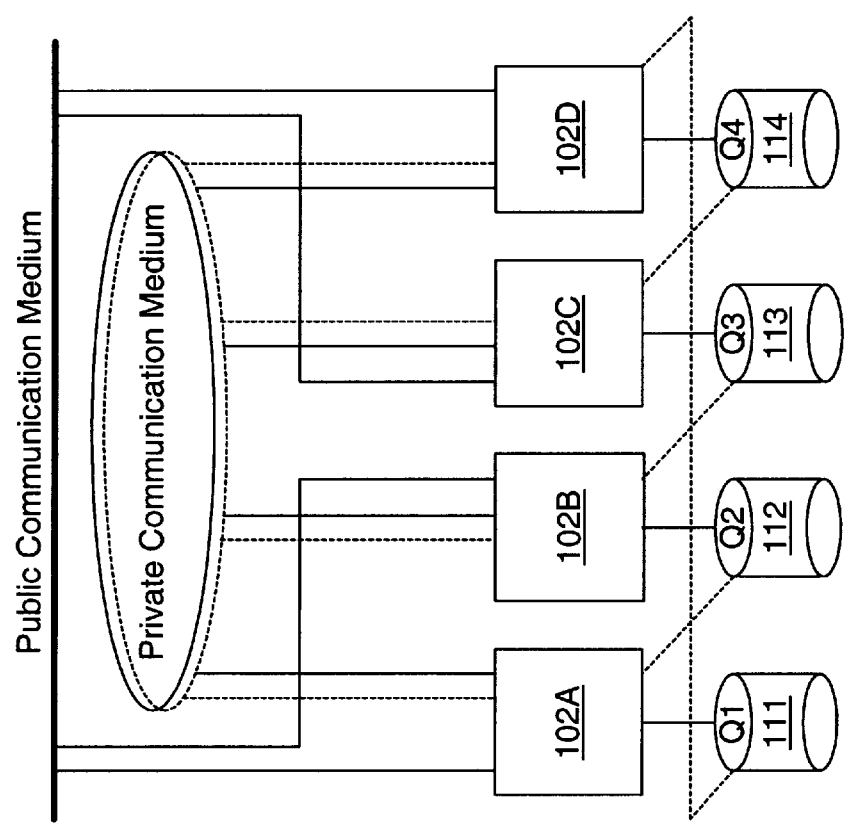
FIG. 1 is a block diagram of a distributed computer system which includes dual-ported devices.

A system with dual-ported storage sub-system is shown in FIG. 1. In this figure, the storage device 111 is accessible from nodes 102A and 102D, storage device 112 is accessible from nodes 102A and 102B, storage device 113 from 102B and 102C, and storage device 114 from 102C and 102D. Note that in this configuration if the two nodes that are connected to a storage device fail, then the data on that storage device is no longer accessible. While the use of mirrored data can overcome this limitation in availability, the required mirroring software has the inherent limitation that it reduces the maximum performance of the system. Furthermore, note that not all the data is local to every node. This implies that a software solution is needed to allow remote access to the devices that are not local. In one embodiment, Netdisk provides such a function. Such a software solution requires the use of the communication medium and is inherently inferior in performance to a solution based on a multi-ported architecture. We will discuss the issues of performance and data availability a bit more below. For the remainder of this section we will concentrate on the issue of data integrity.

A system with dual-ported storage sub-system is shown in FIG. 1. In a traditional cluster, data integrity in a system like that of FIG. 1 is protected at three levels. First, we employ a robust membership algorithm that guarantees a single primary group will continue to function in the case the communication medium fails. Second, we use fail-fast drivers to guarantee that nodes that are "too slow" will not cause problems by not being able to follow the distributed protocols at the appropriate rate. Third, and as a last resort, we use the low level SCSI-2 reservations to fence nodes that are no longer part of the cluster from accessing the shared database. As the issue with multi-ported devices is that exclusive reservations such as those of SCSI-2 standard do not satisfy the requirements of the system, let us concentrate on the issue of disk-fencing.

Disk-fencing is used as a last resort to disallow nodes that are not members of the cluster from accessing the shared database. It operates by an IOCTL reserve command that grants exclusive access to the node requesting the reservation. The question to ask is what classes of failures does this disk fencing protect the system from? Clearly, this low level fencing does not protect the system from truly malicious users. Such adversaries can gain membership into the cluster and corrupt the database while the system's guards are down. Some less intelligent adversaries who cannot gain membership, e.g., because they may not be able to obtain root's password, may be protected against if they happen to get into a node that is not a member. However, if an adversary can gain access to a non-member node of the cluster, could he or she not, and just as easily, gain access to a member node of the cluster? The final analysis regarding malicious adversaries, regardless of their level of sophistication, is that we do not protect against them and need to assume that the system is free of them.

The second category of failures defined above is inadvertent failures. Does disk-fencing provide any protection from inadvertent failures? Once again, the answer is "partially." While nodes that are not members of the clusters cannot write to (or read from) the shared database, those that are members can do so and the system relies on the users with the appropriate privileges to not interfere with the database and corrupt it. For instance, if the operator is logged into a node that is a cluster member and starts to delete files that are used by the database, or worse, starts to edit them, the system provides no protection against such interventions. While the user's intent is not that of a malicious adversary the effect and mechanisms he uses are the same and therefore, we cannot effectively guard against such inadvertent failures.

The third category of failures defined in the previous section is no-fault failures. A system, whether a clustered system or a single node system, should not allow such failures to result in data corruption. The problem is a trivial one for a single node system. If the system goes down, then there is no chance that the data will be corrupted. While obvious, this has an implication for the clustered systems; nodes that are down do not endanger the integrity of the database. Therefore, the only issue that can cause a problem with the data integrity in the system is that the nodes cannot communicate with each other and synchronize their access to the shared database. Let's look at an example of how such a failure can lead to data corruption and investigate the root cause of such a corruption.

Assume that the system of FIG. 1 is used to run an OPS application. This means that the access to the shared database is controlled by the Distributed Lock Manager (DLM). Now assume that node 102A is unable to communicate with the rest of the cluster. According to some membership algorithms, this failure will be detected and the remaining nodes of the system; nodes 102B, 102C, and 102D will form a cluster that will not include node 102A. If node 102A does not detect its own failure in a timely manner, then that node will assume that it is still mastering the locks that were trusted to it. As part of the cluster reconfiguration, other nodes will also think that they are mastering the locks previously owned by node 102A. Now both sides of this cluster, i.e., the side consisting of node 102A and the side with the membership set $\mu=\{102B, 102C, 102D\}$, assume that they can read from and write to the data blocks that they are currently mastering. This may result in data corruption if both sides decide to write to the same data block with different values. This potential data integrity problem is the reason why disk-fencing is used. Disk-fencing does cut the access of the nodes that are not part of the current membership to the shared devices by reserving such devices exclusively. In our example node 102B would have reserved all the disks in storage device 112 and node 102D would have done the same for all the disks in storage device 114. These reservations would have effectively cut off node 102A off from the shared database and protect the integrity of the data.

It is interesting to note that while the above example deals with OPS that allows simultaneous access to the shared devices, the same arguments can be used for other applications that do not allow simultaneous access to the shared data. This observation is based on the fact that the underlying reason for data corruption is not the nature of the application but the inability of the system to detect the failure of the communication medium in a timely manner and therefore, allowing two primary components to operate on the same database. For all applications that need to take over the data accessible from a node that is no longer part of the membership set a similar reservation scheme is needed and the current software does provide such a mechanism.

While the use of disk-fencing is correct in principle, a closer look at the software used to implement the implicit guarantee of data integrity reveals some hidden "windows" that can violate such a guarantee. Furthermore, under most common operating conditions the low level reservations do not add any value to the system as far as data integrity is concerned. To understand the nature and extent of the "windows" that would violate the implicit guarantee of data integrity we must look at the actual implementation of disk-fencing. In some conventional systems, user I/O is indeed allowed prior to the commencement of disk-fencing. This clearly is a flaw that has been over-looked in such systems and allows for the possibility of multiple masters for a lock for a period that could last up to several minutes. This flaw in data integrity assurance is specific to application that use the CVM Cluster Volume Manager. This flaw, however, also points out to a second phenomenon. Despite significant usage for a significant period of time of such distributed systems, there have been no indications, as measured by customer complaints or number of filed bug reports, that data integrity has been compromised.

The lack of complaints regarding data integrity clearly demonstrates that our three tier protection scheme to ensure data integrity is in fact more than adequate and that the first two layers of protection seem to suffice for all practical cases. A closer look at the timing of events in the system and comparing the maximum duration of time required to detect the failure of the communication medium, $T_D$, with the minimum amount of time required to go through the steps of reconfiguration before user I/O is allowed, $T_R$, show that in all practical cases, i.e., those cases where there is some amount of data to protect, the membership algorithm and the fail-fast driver implementation are adequate means of guaranteeing the integrity of the database. In general, if we can guarantee that $T_D<T_R$, then we can guarantee that the membership algorithm will ensure the data integrity of the shared database. It should also be pointed out that many commercial companies who are in the business of fault-tolerant systems, e.g., Tandem Computers Incorporated or I.B.M., do not provide the low-level protection of disk reservation for ensuring that the data trusted to them remains integral. Therefore, what really is the key to providing true data integrity guarantees to the users of a cluster is not the low level reservations, but the timely detection of failures, and in particular, the timely detection of failures in the communication medium. Disk-fencing although not strictly necessary is an extra security measure that eases the customer's mind and is a strong selling point in commercial products. Below, we will propose techniques that guarantee timely detection of communication medium failures. While these techniques are proposed for a multi-ported architecture, they are equally applicable to, although perhaps not as necessary for, dual-ported systems.

4 Proposed Multi-Ported Architectures

Figure 2:
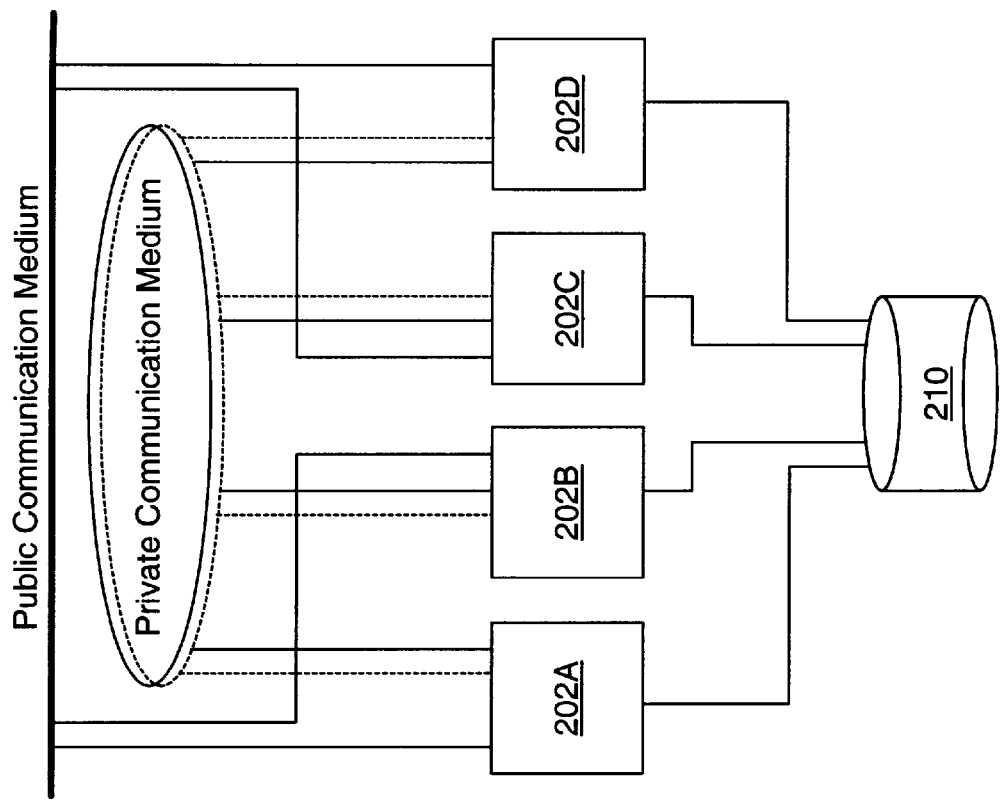
FIG. 2 is a block diagram of a distributed computer system which includes a multi-ported device.

The system shown in FIG. 2 is a minimal multi-ported architecture. In such a system all the storage devices are connected to all the nodes of the cluster. For example, in FIG. 2 the storage device 210 is connected to all the nodes, 202A, 202B, 202C and, 202D. In a typical system there may be many more devices such as storage device 210 that are connected to all the nodes. The storage devices that allow such connectivity are Sonomas and Photons. Photons need a hub to allow such direct connectivity, at least at the present time, but the nature of the data integrity problem remains the same whether there is a hub present in the storage subsystem or not. We will discuss the issues of performance and data availability of such an architecture in the next section.

Before we discuss the proposed modifications to the system software for ensuring the integrity of data, we should explore the conditions under which the SCSI-2 reservations are not adequate. There are two sets of applications that can exist on some distributed systems. One set is composed of OPS and allows simultaneous access to the same shared data block by more than a single node of the cluster. The second set allows only a single node to access a block of data at any given time. These two sets can be differentiated by the volume managers that they use. OPS must use CVM while all the other applications can use VxVM. Note that some applications, i.e., as HA-NFS or Internet-Pro, can use either of the two volume managers as CVM is indeed a super-set of VxVM. Let's first discuss the situation for VxVM based applications and then move to the OPS.

Applications that use VxVM are based on the assumption that the underlying architecture is a shared-nothing architecture. What this means is that the applications assume that there is only one "master" that can access a data item at any given time. Therefore, when that master is no longer part of the cluster the resources owned by it will be transferred to a secondary node that will become the new master. This master can continue to reserve the shared resources in a manner similar to the dual-ported architectures, however, this implies that there can only be one secondary for each resource. This in fact limits the availability of the cluster as multiple secondaries that can be used are not used. To overcome this limitation we can use the forced reserve IOCTL, but this means that the current quorum algorithm, which is also based on SCSI-2 reservations can no longer be used. There are three solutions to the problem of quorum; first, we can set aside a disk (or a controller) to be used as the quorum device and do not put any shared data on that device. Since the membership algorithm guarantees (through the use of the quorum device) that there will be only one primary component in the system, we can be sure that nodes doing the forced reservation for the shared devices are indeed the ones that should be mastering these devices in the new membership set. A second solution is to bring down the cluster when the number of failures reaches N−2, where N is the number of nodes in the cluster. This obviously reduces the availability of the system, but such a cluster would not need to use a quorum device as such devices are only used when N=2. Both of these solutions are not optimal. For the first solution we need to have a disk (for those systems without a controller) reserved for the purpose of quorum and for the second solution we are not utilizing the full availability of the cluster. A third, albeit more complex, solution avoids both of these pitfalls. This solution was originally designed for a system with SDS volume manager, but is equally applicable to a system where nodes use forced reservation. In short, applications using VxVM can be made ultra-available (i.e., as long as there is a path to their data they will be able to operate) and preserve the integrity of the data trusted to them in a multi-ported architecture (such as the one shown in FIG. 2) using the currently supported SCSI-2 reservations.

The situation for OPS is slightly more complex. OPS is based on the assumption that each node that is running an instance of OPS is indeed capable of accessing all the data in the database, whether that data is local or not. This assumption essentially eliminates the use of reservations that are exclusive. While the best solution for ensuring data integrity is to make sure that the optional SCSI-3 persistent group reservations are implemented by the disk drive vendors, there are alternate solutions that can satisfy the data integrity requirements. The two solutions proposed in this section are based on the observation of the previous section; if we can ensure that the following inequality is satisfied, then we are guaranteed that the data will remain integral for no-fault class of failures:

$$\text{Max}\{T_D\} < \text{Min}\{T_R\} \tag{1}$$

In equation (1), $T_D$ is the time it takes to detect the failure of the communication medium and start a reconfiguration and $T_R$ is the time it takes for the reconfiguration on a secondary node to allow user I/O activities to commence. The current value of minimum value of $T_R$ is 5 seconds, but that value is for a system without any application or database on it. A more typical value for $T_R$ is in order of (anywhere from 1 to 10) minutes. This implies that the maximum value of $T_D$ must be less than 5 seconds if we intend to be strictly correct. The solutions proposed in this section are complementary. In fact, the first solution, called disk-beat, guarantees that the inequality of equation (1) is met, and therefore, is sufficient. The second solution is an added security measure and does not guarantee data integrity by itself, but it can help the detection process in most cases. Therefore, the implementation of the second solution, which relies on reconfiguration messages over the public-net, is optional.

Figure 3:
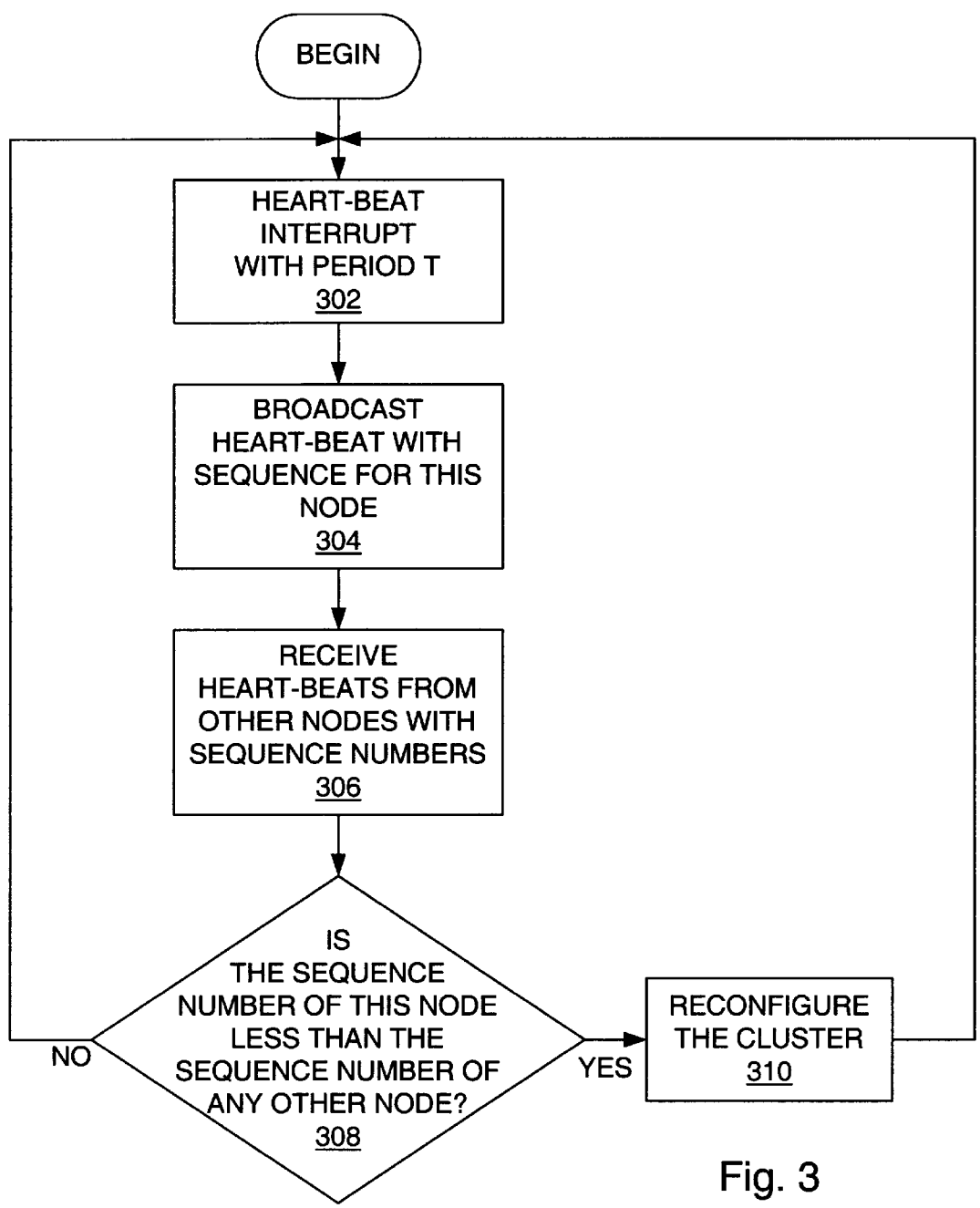
FIG. 3 is a logic flow diagram of the determination that a node has failed in accordance with the present invention.

In the disk-beat solution, the Cluster Membership Monitor (CMM) creates an I/O thread that writes to a predefined location on the shared storage device its sequence number. In one embodiment, the sequence number is broadcast to other nodes through heart-beat messages (steps 302 and 304 in FIG. 3). The sequence number represents, in one embodiment, the number of times the cluster to which the subject node belongs has been reconfigured. In addition, the same thread also will read the sequence number of the other nodes in the cluster (step 306). If it finds that its sequence number is lagging behind that of any other cluster members, i.e., is less than the sequence number of any other node (test step 308), then it will execute a reconfiguration (step 310). The location of the "array" of sequence numbers and their relative ordering is specified by the Cluster Data Base (CDB) file. The read and write activity is a periodic activity that takes place with period T, where $T \leq \text{Max}\{T_D\}$. Note that as the thread will be a real-time thread with the highest priority and the processor that it will be executing on does not take any interrupts, therefore, the execution of the periodic read and write as well as the commencement of the reconfiguration is guaranteed to happen within the specified time period. Further note that the disk-beat solution is merely a way of preventing two sides of a disjoint cluster from staying up for any significant period of time. Finally, note that this solution is asynchronous with respect to the reconfiguration framework and is more timely than the one used in current systems.

Figure 4:
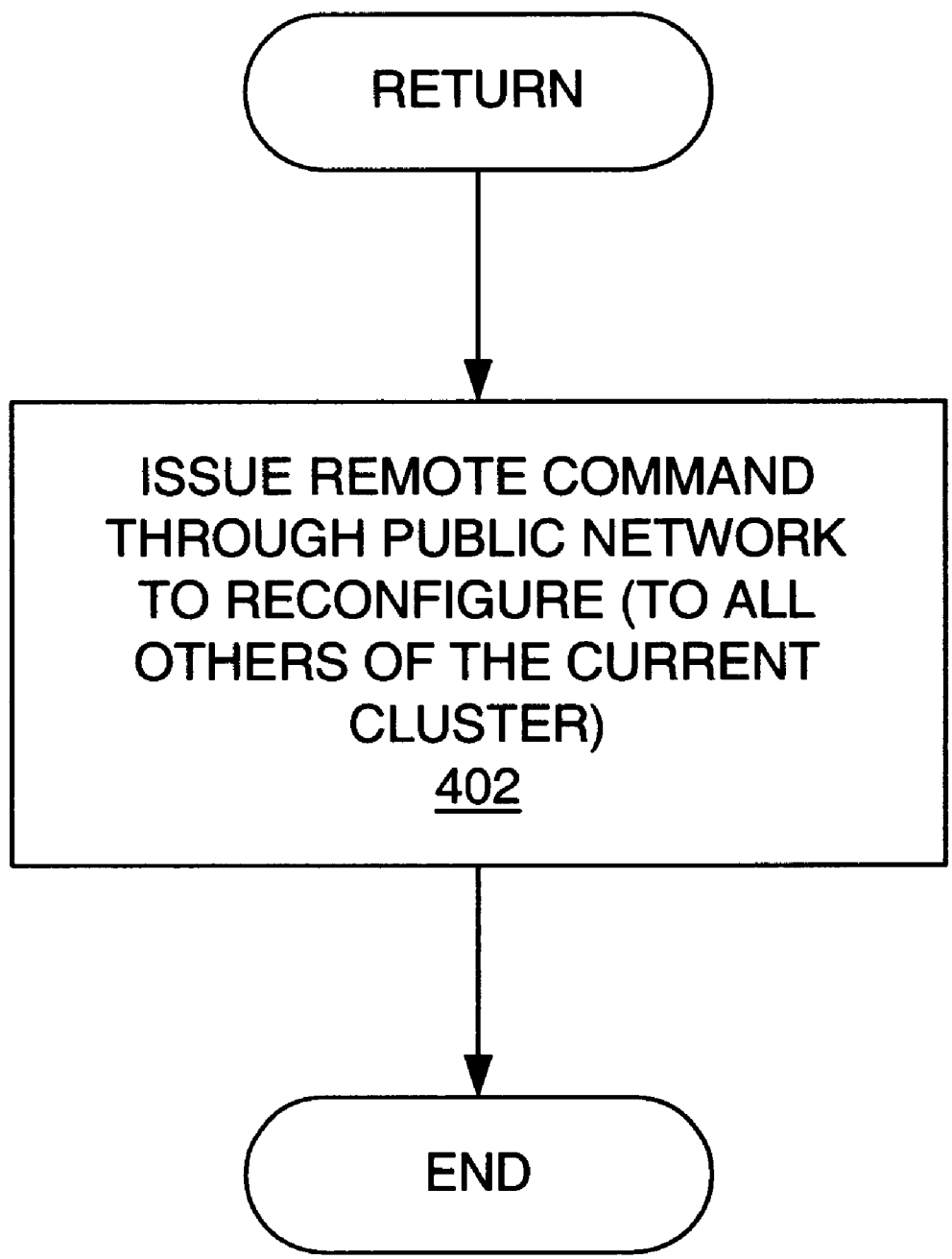
FIG. 4 is a logic flow diagram of the broadcasting of a reconfiguration message in accordance with the present invention.

The second, and optional, solution relies on the public net for delivery of a message and is based on a push technique. This message is in fact a remote shell that will execute on all nodes of the cluster. Once a node hits the return transition, which may indicate that a failure has occurred, that node will do a rsh clustm reconfig operation on all other nodes of the cluster (step 402 in FIG. 4). Since reconfiguration is a cluster wide activity and since most of the time the nodes would go through the reconfiguration in a short period of time, the addition of this call does not introduce a significant overhead in terms of unnecessary reconfigurations. As mentioned earlier, however, this solution does not guarantee the data integrity as the disk-beat solution does and will only be used in the system if it is deemed helpful for quicker detection of failures.

In any system there is a small, but non-zero, probability that the system is not making any forward progress and is "hung". In a clustered system, a node that is hung can cause the rest of the cluster to go through a reconfiguration and elect a new membership that does not include the hung node. While the disk-beat solution of previous section guarantees that a node will detect the failure of the communication medium, it is based on the assumption that this node is active. The fencing mechanisms, such as those based on the SCSI-2 exclusive reservation schemes, can protect the data integrity in the case of nodes that are inactive, or hung, for a period of time and then come back to life and start issuing I/O commands against the shared database. To raise the level of protection against such failures for systems that cannot use the exclusive reservations, we use a second protection mechanism based on the fail-fast drivers. This scheme is already in place, implemented as part of the original membership monitor, and works by having a thread of the CMM arming and re-arming a fail-fast driver periodically. If the node cannot get back to re-arm the driver in its alloted time, the node will panic. Let's say that the periodic re-arming activity will happen with period $T_{ff}$. If we can guarantee the inequality of equation (2) is satisfied then we can guarantee that there will be no new I/O issued against the shared data base when the node "wakes up".

$$\text{Max}\{T_{ff}\} < \text{Min}\{T_R\} \quad (2)$$

It is important to note that the fail fast driver is scheduled by the clock interrupt, the highest priority activity on the entire system. However, the fail fast does not happen as part of the interrupt and there is a window during which the I/O already committed to the shared database may be written to it. Since the fail fast driver is handled by the kernel and has the priority of the kernel, this window will be small. In addition, nodes that are hung are typically brought back to life via a reboot. This, by definition, eliminates this node as a potential source of data corruption. The only situation which may allow our proposed system to compromise the integrity of the data due to a no-fault failure is a hung node that is brought back to life as a member of the cluster and has user I/O queued up in front of the two highest priority tasks in the system. Needless to say, this is an extremely unlikely scenario.

5 Analysis and Conclusions

Above, we have looked at the issue of data integrity for two different architectures of clustered systems. The difference in the cluster architecture is due to the differences in the storage sub-system. In one case the storage sub-system is entirely composed of dual-ported storage devices and in the other case the storage sub-system is entirely composed of multi-ported devices. We classified and analyzed the various types of failures that a clustered system can see and tolerate and discussed the methods the system employs in the current dual-ported architectures to ensure data integrity in presence of such failures.

As pointed out above for applications that utilize the VxVM volume manager, the addition of multi-ported storage sub-system does not pose any danger to the data integrity. In fact, for such systems the multi-ported storage sub-system increases the degree of high-availability to (N−1), where N is the number of nodes in the cluster. To achieve this level of high-availability we found out that some modification to the quorum algorithm is necessary.

For the applications that use CVM as their volume manager, i.e., OPS, the lack of low level SCSI-2 reservations in multi-ported architectures can be overcome with the introduction of disk-beat. This technique will protect the data integrity against the same class of failures that disk fencing does and showed an additional algorithm based on the use of public net that can further improve the timing of reconfigurations, in general, and detection of failed communication medium, in particular. While a multi-ported architecture does not suffer from a lack of guaranteed data integrity in our system, it enjoys the inherent benefits of additional availability and increased performance. Performance is enhanced on several fronts. First, no software solution is needed to create the mirage of a shared-disk architecture. Second, with the use of RAID-5 technology the mirroring can be done in hardware. Finally, such the system can truly tolerate the failure of N−1 nodes, where N is the number of nodes in the cluster, and continue to provide full access to all the data.

The comparison of dual-ported and multi-ported architectures done in this paper clearly indicate the inherent advantages of the multi-ported systems over dual-ported systems. However, dual-ported systems are able to tolerate some benign malicious failures and pilot errors that are not tolerated by multi-ported systems. While these are nice features that will be incorporated into the multi-ported architectures with the implementation of SCSI-3 persistent group reservations, they only affect OPS and are not general enough to guard the system against an arbitrary malicious fault or even an arbitrary inadvertent fault.

The above description is illustrative only and is not limiting. The present invention is therefore defined solely and completely by the appended claims together with their full scope of equivalents.

What is claimed is:

1. A method for operating a clustered computer system including at least a first node and a second node, the method comprising:

a first software controlled process executing in said first node, wherein the first software controlled process is configured to cause a reconfiguration of a cluster configuration in response to detection of a failure; and a second software controlled process executing in said second node, wherein said second software controlled process is configured to detect said failure within a period of time which is less than the time for performing said reconfiguration, and wherein said second software controlled process is executed in real time to guarantee that said second software controlled process detects said failure within the time for performing said reconfiguration;

wherein said first node and said second node are configured to each separately detect said failure by:

writing a first sequence number identifying a particular configuration of a cluster to which each node is a member to a shared storage device;

reading a second sequence number from each other node in said cluster;

comparing said first sequence number written to said shared storage device to said second sequence number read from each other node in said cluster; and initiating said reconfiguration of said cluster configuration if said first sequence number written to said shared storage device is less than said second sequence number read from each other node in said cluster.

2. The method as recited in claim 1, wherein said second software controlled process is executed periodically with a frequency which has a period less than a period of time for performing said reconfiguration of said cluster.

3. The method as recited in claim 1, wherein said method further comprises sending a reconfiguration message to each other node in said cluster through a public communication medium.

4. A computer readable medium useful in association with a clustered computer system which includes a first node and a second node, the computer readable medium including computer instructions executable to implement a method comprising:

a first software controlled process executing in said first node, wherein the first software controlled process is configured to cause a reconfiguration of a cluster configuration in response to detection of a failure; and a second software controlled process executing in said second node, wherein said second software controlled process is configured to detect said failure within a period of time which is less than the time for performing said reconfiguration, and wherein said second software controlled process is executed in real time to guarantee that said second software controlled process detects said failure within the time for performing said reconfiguration;

wherein said first node and said second node are configured to each separately detect said failure by:

writing a first sequence number identifying a particular configuration of a cluster to which each node is a member to a shared storage device;

reading a second sequence number from each other node in said cluster;

comparing said first sequence number written to said shared storage device to said second sequence number read from each other node in said cluster; and initiating said reconfiguration of said cluster configuration if said first sequence number written to said shared storage device is less than said second sequence number read from each other node in said cluster.

5. The computer readable medium as recited in claim 4, wherein said second software controlled process is executed periodically with a frequency which has a period less than a period of time for performing said reconfiguration of said cluster.

6. The computer readable medium as recited in claim 4, wherein said method further comprises sending a reconfiguration message to each other node in said cluster through a public communication medium.

7. A computer system comprising:

a first node;

a second node coupled to said first node, wherein said first node is configured to execute a first software controlled process which causes a reconfiguration of a cluster configuration in response to detection of a failure; and wherein said second node is configured to execute a second software controlled process which detects said failure within a period of time which is less than the time for performing said reconfiguration, and wherein said second software controlled process is executed in real time to guarantee that said second software controlled process detects said failure within the time for performing said reconfiguration;

wherein said first node and said second node are further configured to each separately detect said failure by:

writing a first sequence number identifying a particular configuration of a cluster to which each node is a member to a shared storage device;

reading a second sequence number from each other node in said cluster;

comparing said first sequence number written to said shared storage device to said second sequence number read from each other node in said cluster; and initiating said reconfiguration of said cluster configuration if said first sequence number written to said shared storage device is less than said second sequence number read from each other node in said cluster.

8. The computer system as recited in claim 7, wherein said second software control process is executed periodically with a frequency which has a period less than a period of time for performing said reconfiguration of said cluster.

9. The computer system as recited in claim 7, wherein said step of initiating a reconfiguration of said cluster comprises sending a reconfiguration message to each other node in said cluster through a public communication medium.

* * * * *